United States Patent Office 3,630,943
Patented Dec. 28, 1971

3,630,943
PREPARATION OF ABSORBENTS FOR SULFUR
OXIDE REMOVAL
John G. Myers and Joseph H. Field, Pittsburgh, Pa., assignors to the United States of America as represented by the Secretary of the Interior
Filed Aug. 14, 1969, Ser. No. 850,098
Int. Cl. C09k 3/00
U.S. Cl. 252—190                                6 Claims

ABSTRACT OF THE DISCLOSURE

Mixtures of sulfate salts selected from the group consisting of $Al_2(SO_4)_3\text{-}CuSO_4$; $CuSO_4\text{-}Fe_2(SO_4)_3$; and $Fe_2(SO_4)_3\text{-}Al_2(SO_4)_3$ are decomposed to the corresponding oxides and made into particulate form for use as an absorbent in sulfur oxide absorption from gases. The absorbents can be used unsupported or on a suitable support material. In either case, the absorbents are capable of regeneration.

BACKGROUND OF THE INVENTION

Field of invention

This invention relates to improved absorbents for use in gas purification. Further, this invention relates to a method of preparing said absorbents and also the methods of using said absorbents to remove acidic oxygenated sulfur compounds (hereinafter referred to as sulfur oxides), more particularly, inorganic acidic sulfur oxides from gases.

As presnt, the largest portion of sulfur oxide emissions results from the combustion of certain types of coal and oil which contains appreciable amounts of sulfur. Other sources of sulfur oxide contamination include water gas, smelting gases, petroleum or tar distillation gases and sulfuric acid plant effluents.

The release into the atmosphere of gases containing sulfur oxides presents a serious air pollution and public health problem. Currently, tens of millions of tons of sulfur oxides are vented into the air over populated regions each year. The damage caused by this pollution is enormous and there is general agreement among the industrialized nations that sulfur oxide emissions must be reduced.

One method designed to prevent pollution which has been used in some localities is to limit power plants to the burning of fuels low in sulfur content. The efficacy of this approach is in many instances overcome by the unavailability or high cost of low sulfur content fuels. Attempts have also been made to desulfurize fuels prior to combustion. While light fuel oils can be desulfurized by treatment with hydrogen and are often so treated if hydrogen is available from a reforming operation and if the treatment does not deleteriously affect the hydrocarbon structure, heavier fuel oils are rarely desulfurized because their sulfur content is more tenaciously bound and because desulfurization would be too costly. No process to date will economically desulfurize coal.

Consequently, if advantage is to be taken of the availability of sulfur containing fuels and if other sources of sulfur oxide emissions are to be controlled, resort must be made to an efficient and economical method of removing sulfur oxides from flue gases, moreover as sulfur is a valuable natural resource of limited supply, recovery of sulfur is highly desirable.

Description of prior art

Prior art methods of removing sulfur oxides from flue gases can be classified under the following general categories:

(1) additive processes,
(2) oxidation of sulfur dioxide,
(3) reduction of sulfur oxides to sulfur,
(4) wet absorption of processes,
(5) dry adsorption processes, and
(6) dry absorption processes.

In additive processes, materials having the ability to combine with sulfur trioxide are added to either the fuel or combustion gases. Additives which have been employed include: ammonia, soda, limestone, magnesite and dolomite. These additives have the disadvantage of high cost and inability to undergo regeneration.

Direct oxidation of sulfur dioxide to sulfur trioxide by passage over a vanadium oxide or platinum contact mass is possible. However, the low concentration of sulfur oxides in most flue gases causes the ultimate sulfuric acid product to be diluted. Also, impurities present in the stack gases tend to contaminate the sulfuric acid obtained.

Reduction of sulfur dioxide to sulfur or other sulfur compounds is possible with hydrogen, hydrogen sulfide, carbon monoxide, methane, metallic sulfides, natural gas, and carbon. None of these processes has proven to be an economical means of sulfur oxide removal from stack gases.

Wet washing of waste gases with water to remove sulfur dioxide is not practical because of the low solubility of sulfur dioxide. A large number of additives have been proposed to increase the absorptivity of aqueous solutions or slurries. These additives include, manganese, sulfate, calcium, bicarbonate, lime, ammonia, and sodium sulfite-bisulfite. The fundamental drawback of all wet processes is that the flue gas must be cooled to a low temperature, below 100° C., for the absorption to take place. Gases treated in this manner usually exit at a very low temperature and are saturated with water vapor. Hence, they have a low buoyancy and a tendency to sink upon emission from a stack rather than rising as desired.

Sulfur dioxide can be adsorbed at low temperature by materials such as aluminum oxide, silica, gel, synthetic zeolites and activated carbon. Since, however, these materials cannot hold sulfur dioxide at elevated temperatures adsorption processes possess the same drawback as wet absorption processes.

Absorption of sulfur oxides at high temperatures has been reported with alkalized alumina and manganese oxide. While these absorbents are able to operate at moderately high temperatures, operational costs have to date prohibited their large scale use.

As a result, there remains in the art a critical need for an efficient and economical method of recovering sulfur oxides from flue gases.

SUMMARY

We have now discovered that improved absorbents for sulfur oxide removal from gaseous mixtures can be formed from combinations of sulfate salts which are later converted to oxides. We have further discovered that these absorbents may be used alone or on a support, and can be regenerated for further use.

Accordingly, the objects of this invention are:

To provide improved forms of sulfur oxide absorbents,
To provide a method of making said improved absorbents, and
To provide a method of removing sulfur oxides from gases using said improved absorbents.

These and other objects and advantages of the invention will be more clearly ascertained from a consideration of the following description of the drawings and preferred embodiments.

DESCRIPTION OF THE PREFERRED EMBODIMENTS

Figure 1:
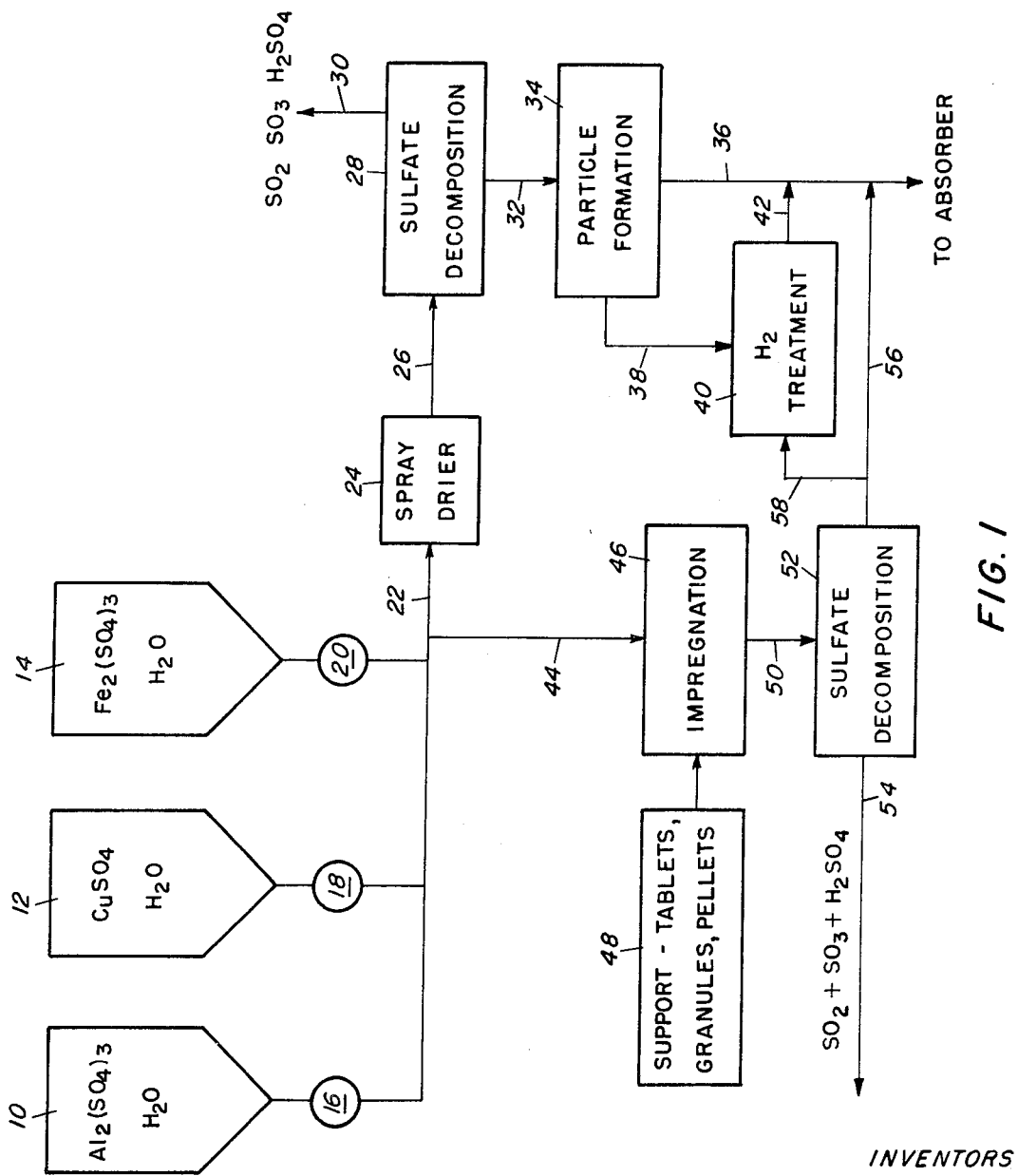
FIG. 1 is a simplified flow diagram illustrating the alternative methods of preparing the improved absorbents of this invention.

Referring now to FIG. 1, there is shown in schematic form alternative means of preparing the absorbents of the present invention. Solutions of $Al_2(SO_4)_3$, $CuSO_4$ and $Fe_2(SO_4)_3$ are contained in tanks 10, 12 and 14, respectively. The sulfate solutions can be prepared from either the metals or their various ores. The source is not critical. The concentration and consistency of the solutions should be such that they can be either spray dried to solid form or used to impregnate a support.

Valves 16, 18 and 20 are used to form the desired mixture of sulfates. Once the mixture is formed, it can be used to prepare either supported or non-supported absorbents. If non-supported absorbents are desired, the mix is passed via line 22 to 24 where the sulfate solution is spray dried using conventional techniques to a solid state. The solid sulfate mix is then passed via line 26 to a sulfate decomposition zone 28 where the mixture is heated to a temperature in the range of from about 750°–900° C. to decompose the sulfates to the corresponding metal oxides. During this operation $SO_2$, $SO_3$ and $H_2SO_4$ are removed via line 30 and can be used in the preparation of $H_2SO_4$ or in the preparation of the starting sulfate solutions. Following sulfate decomposition, the mixed oxides are passed via line 32 to zone 34 where they are formed by conventional techniques into tablets, granules or pellets as desired. The absorbent now consolidated into particulate form can be passed via line 36 for use as is in an absorber or, it can be sent via line 38 to a pretreatment with reducing gas at 40. The pretreatment temperature may range from about 250 to 650° C. with a temperature of about 400° C. preferred. The time of treatment may vary from 10 minutes to 4 hours. Hydrogen is the preferred reducing gas. Following pretreatment at 40, the absorbent is passed via line 42 to line 36 and then to an absorption unit.

If supported absorbents are desired, the mixture of sulfate solutions in line 22 is passed via line 44 to an impregnation zone 46 where a suitable support material 48 in the form of tablets, granules, or pellets is impregnated by standard techniques with the mixture of sulfates.

Following impregnation, the absorbent is sent via line 50 to decomposition zone 52 where the sulfates are thermally decomposed at a temperature of from about 750–900° C. causing the emission of $SO_2$, $SO_3$ and $H_2SO_4$ via line 54. The absorbent, now in oxide form may be sent via lines 56 and 36 to an absorber or, may be sent via line 58 to zone 40 for a pretreatment with a reducing gas and then to the absorber as previously described in reference to the unsupported absorbents.

It is readily understood with reference to FIG. 1, that a variety of absorbent compositions may be manufactured by the process of this invention. In both unsupported and supported embodiments, binary mixtures of Al-Cu; Cu-Fe; and Fe-Al are contemplated, in the ranges of from 10/1–1/10. Preferably the ratio of metals will be from 4/1–1/4 or less. A tertiary mixture of Al-Cu-Fe oxides is also contemplated. In this embodiment, each of the metals may comprise from 1 to 90 percent of the total in terms of molar ratios.

Support materials are limited to those which can withstand the temperatures and other conditions imposed in the adsorption method as described below. In this connection, carbon may not be used as a support. Suitable supports include those selected from the group consisting of silica, alumina, and silica alumina. The physical form of the absorbent will generally be that of spheres, pellets, tablets or granules. The physical form is not a critical limitation. Those familiar with absorption processes will be able to choose the most suitable form for use in any specific sulfur oxide removal process.

Figure 2:
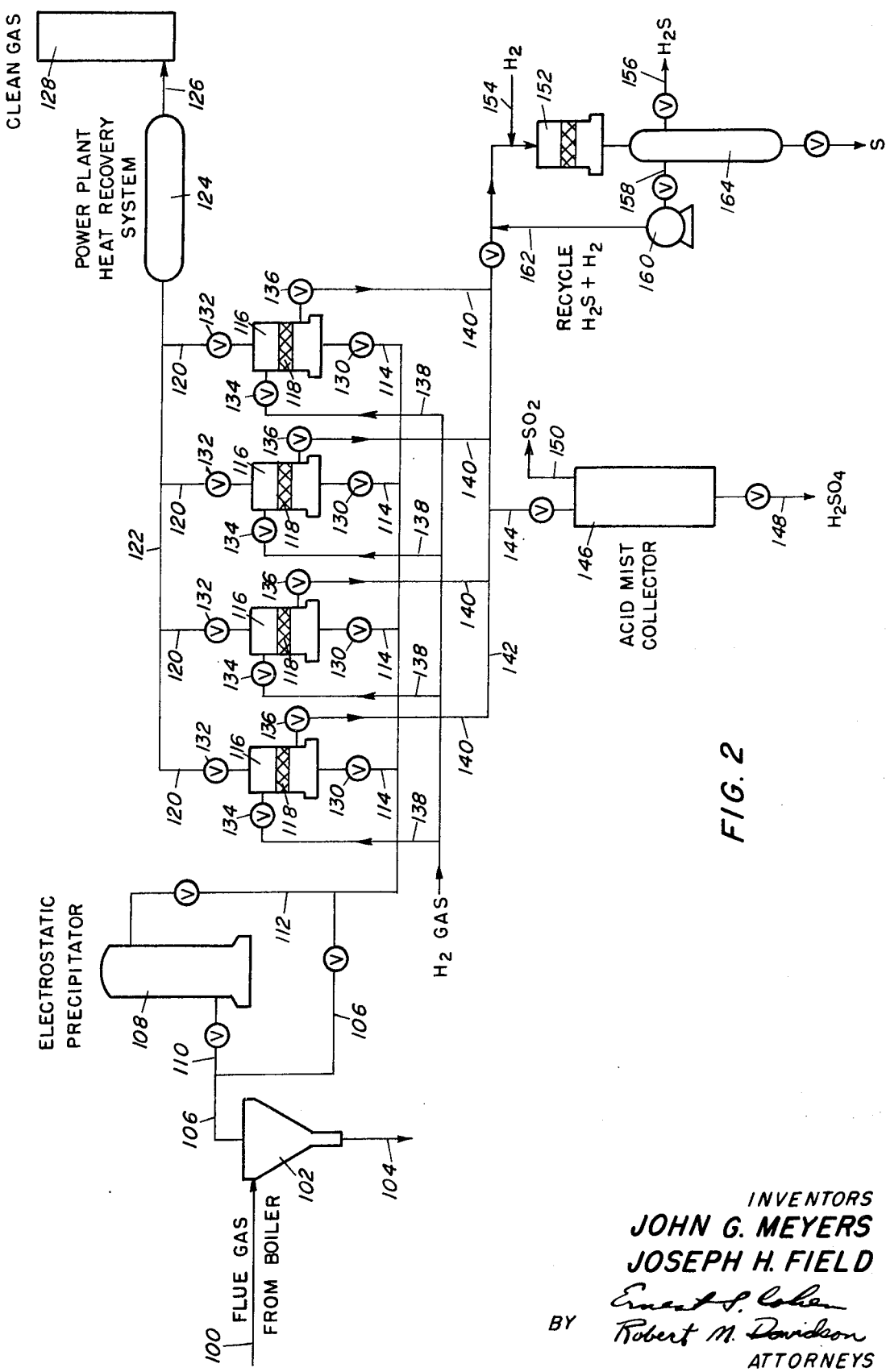
FIG. 2 is a simplified flow diagram illustrating the use of the improved absorbents in the removal of sulfur oxides from flue gases.

A method of removing sulfur oxides from gases using the abovedescribed absorbents is shown in FIG. 2. There, a gas 100, containing sulfur oxides such as for example a typical flue gas resulting from the combustion of a fuel containing sulfur is passed to separator 102 where particulate solids 104 such as fly ash are removed. If particulate matter is sufficiently removed, the flue gases can be passed via 106 to the contact zone. Alternatively, the flue gas may be further treated in precipitator 108 entering via line 110 and leaving via line 112.

After solids removal, the gases are passed via line 106 and then feeder lines 114 to absorbers 116. Each of the absorbers 116 contains a bed of absorbent material 118. As the gases pass through these beds, the sulfur oxides are absorbed by the beds. Beds 118 may be of the fixed, moving, or fluidized type. Using the absorbents of the present invention, 90% removal of sulfur oxides entering the gases can easily be achieved. After passing through bed 118, the gases exit absorbers 116 via lines 120 and 122. As shown in FIG. 2 the treated gases may pass through a heat recovery system 124 when desirable prior to passage via line 126 to stack 128.

When the absorbent beds 118 become spent and sulfur oxide removal falls below a preselected level as for example 90%, the beds can be regenerated in situ. Regeneration is initiated by closing valves 130 and 132 and opening valves 134 and 136. This allows a reducing gas such as hydrogen to be passed through lines 138 to absorbers 116 where it contacts beds 118 and then exits the absorbers via lines 140. Regeneration with a reducing gas occurs at temperatures in the range of from about 350°–650° C., preferably in the range of from 350–450° C. Alternatively, the absorbent can be regenerated by heating, in a non-reducing environment, to a temperature above 700° C. and preferably from 750–900° C. If this method is used, it is desirable, though not necessary, to briefly treat the regenerated absorbent with a reducing gas at a temperature of from about 350–650° C. and preferably from 350–450° C.

The effluent gases resulting from regeneration exit absorbers 116 via lines 140 to line 142. At this point, there are two alternate means of treating the $SO_2$ rich regeneration effluent. One method involves feeding the gases via line 144 to an acid mist collector 146 to recover dilute sulfuric acid 148 and to produce a purified $SO_2$ stream 150. This stream can serve as the input to a sulfuric acid plant.

Alternately, the gases from line 142 can be fed to Claus plant 152 where the $SO_2$ is reduced with hydrogen 154 to produce sulfur and hydrogen sulfide. The hydrogen sulfide may be withdrawn via line 156 or recycled via line 158, pump 160 and line 162 to the Claus reactor 152. The sulfur is recovered in collector 164.

It will be appreciated by those skilled in the art that there are numerous variations on the flow plan as shown in FIG. 2 which are within the scope of the invention. For example, some of the absorbers 116 may be absorbing sulfur oxides while others are being regenerated thereby achieving a continuous absorption without need for shutdown. Further separate contactors may be used for absorption and regeneration with the absorbent passing between them. Still other modifications may be made in the flow plans to adapt the absorption process to specific needs and uses.

The following examples illustrate absorbents and their methods of manufacture contemplated by the present invention along with the various features and advantages of the present invention over the prior art.

In all the following examples, the absorbents were tested with a simulated flue gas having a $SO_2$ content in the range of from 0.28–0.32 percent. The space velocity in each case was 1050 hr.$^{-1}$. "Spent absorbent" as referred to in these examples means that removal of the sulfur oxides from the flue gases fell below 90%.

Example 1

A 2/1 mixture of $Al(SO_4)_3/CUSO_4$ was dissolved in hot water, dried to form a solid mixture of sulfate, and decomposed at 750° C. Water was added to form a paste which was dried at 180° C. for 4 hours and then crushed to 6–16 mesh. This absorbent had a $SO_2$ capacity of 24.5 grams per 100 grams absorbent at 90% removal of $SO_2$ from the simulated flue gas at 550° C.

Example 2

Spent absorbent from Example 1 was thermally regenerated for 5 hours in a muffle furnace at 750° under non-reducing conditions. The regenerated absorbent had a loading capacity of 22.4 grams $SO_2$/100 grams absorbent at 90% $SO_2$ removal from the simulated flue gas at 550° C.

Example 3

Spent absorbent from Example 2 was thermally regenerated for 5 hours in a muffle furnace at 750° C. under non-reducing conditions. The regenerated absorbent had a loading capacity of 14.4 grams $SO_2$/100 grams absorbent at 90% $SO_2$ removal from the simulated flue gas at 550° C.

Example 4

Spent absorbent from Example 3 was thermally regenerated for 5 hours in a muffle furnace at 750° C. under non-reducing conditions. The regenerated absorbent had a loading capacity of 20.4 grams $SO_2$/100 grams absorbent at 90% $SO_2$ removal from the simulated flue gas at 550° C.

Example 5

An absorbent was prepared as in Example 1 with the exception that the absorbent was further treated by contact with $H_2$ for 1 hour at 400° C. This absorbent had a loading capacity of 22.5 grams $SO_2$/100 grams absorbent at 90% $SO_2$ removal from the simulated flue gas at 400° C.

Example 6

An absorbent was prepared as in Example 1 with the exceptions that is was formed into ⅛″ x ⅛″ tablets and treated with $H_2$ at 400° C. for 4 hours. This absorbent had a loading capacity of 22.0 grams $SO_2$/100 grams absorbent at 90% $SO_2$ removal from the simulated flue gas at 400° C.

Example 7

Spent absorbent from Example 6 was regenerated with $H_2$ at 400° C. for 4 hours. This regenerated absorbent had a loading capacity of 21.7 grams $SO_2$/100 grams absorbent at 90% $SO_2$ removal from the simulated flue gas at 400° C.

Example 8

Spent absorbent from Example 7 was regenerated with $H_2$ at 400° C. for 4 hours. At 90% $SO_2$ removal from the simulated flue gas this regenerated absorbent had loading capacities of 18.9 grams $SO_2$/100 grams absorbent at 330° C.; 21.0 grams $SO_2$/100 absorbent at 350° C.; 23.9 grams $SO_2$/100 grams absorbent at 370° C.; 28.2 grams $SO_2$/100 grams absorbent at 410° C.; 30.9 grams $SO_2$/100 absorbent at 500° C.; and 34.4 grams $SO_2$/100 grams absorbent at 550° C.

Example 9

982.8 grams of $Al_2(SO_4)_3 18H_2O$ and 20.0 grams of $CuSO_4$ was dissolved in 1002.8 grams of $H_2O$ giving a Al/Cu ratio of 10/1. This solution was dried, decomposed at 750° C., made into a paste, dried at 180° C. and crushed. It was then pretreated with $H_2$ for 10 hours at 650° C. This absorbent had a loading capacity of 0.8 gram $SO_2$/100 grams absorbent at 90% $SO_2$ removal of the simulated flue gas at 130° C.

Example 10

Spent absorbent from Example 9 was regenerated by heating in a muffle furnace at 750° C. for 20 hours, treated with $H_2$ at 650° C. for 10 hours and with reformed gas at 650° C. for 16 hours. This regenerated absorbent had a loading capacity of 1.8 grams $SO_2$/100 grams absorbent at 90% $SO_2$ removal from the simulated flue gas at 330° C.

Example 11

407.0 grams of CuSO and 200.0 grams of $$Al_2(SO_4)3 \cdot 18H_2O$$

were dissolved in 1014.0 grams of $H_2O$ giving a Cu/Al ratio of 10/1. This solution was dried, decomposed at 750° C., and made into a paste. 1% graphite was added in order to form 3/16″ pellets. This absorbent had a loading capacity of 14.4 grams $SO_2$/100 grams absorbent at 90% $SO_2$ removal from the simulated flue gas at 500° C.

Example 12

Spent absorbent from Example 11 was regenerated with $H_2$ for 10 hours at 650° C. at 90% $SO_2$ removal from the simulated flue gas this regenerated absorbent had loading capacities of 1.3 grams $SO_2$/100 grams absorbent at 330° C.; 8.5 grams $SO_2$/100 grams absorbent at 450° C.; and 11.0 grams $SO_2$/100 grams absorbent at 500° C.

Example 13

$CuSO_4$ and $Fe_2(SO_4)$ in a ratio of 2/1 Cu/Fe were dissolved in hot water, dried, decomposed at 750° C., made into a paste, dried at 180° C. and crushed to 8–16 mesh. At 90% $SO_2$ removal from the simulated flue gas this absorbent had loading capacities of 8.6 grams $SO_2$/100 grams absorbent at 330° C.; 13.0 grams $SO_2$/100 grams absorbent at 450° C.; 14.8 grams $SO_2$/100 grams absorbent at 500° C. and 16.6 grams $SO_2$/100 grams absorbent at 550° C.

Example 14

Spent absorbent from Example 13 was thermally regenerated in a muffle furnace at 750° C. under non-reducing conditions for 16 hours. At 90% $SO_2$ removal from the simulated flue gas this regenerated absorbent had loading capacities of 1.0 grams $SO_2$/100 grams absorbent at 400° C.; 6.6 grams $SO_2$/100 grams absorbent at 450° C.; and 12.3 grams $SO_2$/100 grams absorbent at 500° C.

Example 15

Spent absorbent from Example 14 was regenerated with $H_2$ for 16 hours at 400° C. At 90% removal of $SO_2$ from the simulated flue gas this regenerated absorbent had loading capacities of 4.7 grams $SO_2$/100 grams absorbent at 330° C.; 8.1 grams SO/100 grams absorbent at 365° C.; 13.1 grams $SO_2$/100 grams absorbent at 400° C.; and 19.9 grams $SO_2$/100 grams absorbent at 450° C.

Example 16

1000.0 grams of $CuSO_4$ and 170.4 grams of $Fe_2(SO_4)_3$ were dissolved in 3170.4 grams of $H_2O$, dried, decomposed at 750° C. formed into a paste, pelleted into 3/16″ pellets and pretreated with $H_2$ at 650° C. for 10 hours. This absorbent had a loading capacity of 1.8 grams $SO_2$/100 grams absorbent at 330° C.

Example 17

852.0 grams of $Fe_2(SO_4)_3$ and 50.0 grams of $CuSO_4$ were dissolved in 2706.0 grams of $H_2O$, dried, decomposed at 750° C., pressed into a cake, crushed to 8–16 mesh and pretreated with $H_2$ for 10 hours at 650° C. At 90% $SO_2$ removal from the simulated flue gas, this absorbent had loading capacities of 1.0 grams $SO_2/100$ grams absorbent at 330° C. and 1.6 grams $SO_2/100$ grams absorbent at 450° C.

Example 18

$Fe_2(SO_4)_3$ and $Al_2(SO_4)_3$ were dissolved in hot water at a ratio of 2/1 Fe/Al, dried to solid form, decomposed at 750° C. and formed into ⅛″ x ⅛″ tablets. This absorbent had a loading capacity of 4.2 grams $SO_2/100$ grams absorbent at 90% removal of $SO_2$ from the simulated flue gas at 450° C.

Example 19

Spent absorbent from Example 18 was regenerated with $H_2$ for 16 hours at 400° C. At 90% $SO_2$ removal from the simulated flue gas this regenerated absorbent had loading capacities of 26.3 grams $SO_2/100$ grams absorbent at 400° C. and 32.7 grams $SO_2/100$ grams absorbent at 450° C.

Example 20

Spent absorbent from Example 19 was regenerated with $H_2$ for 16 hours at 400° C. At 90% $SO_2$ removal from the simulated flue gas this absorbent had loading capacities of 3.8 grams $SO_2/100$ grams absorbent at 365° C.; 17.9 grams $SO_2/100$ grams absorbent at 400° C.; and 34.4 grams $SO_2/100$ grams absorbent at 450° C.

Example 21

1872.0 grams of $Al_2(SO_4)_3 \cdot 18H_2O$ and 72.0 grams of $Fe_2(SO_4)_3 \cdot nH_2O$ were dissolved in 1944.0 grams of $H_2O$ giving a Al/Fe ratio of 10/1. This solution was dried, decomposed at 750° C., pelleted into 3/16″ pellets and pretreated with $H_2$ for 10 hours at 650° C. This absorbent had a loading capacity of 1.3 grams $SO_2/100$ grams absorbent at 90% $SO_2$ removal from the simulated flue gas at 130° C.

Example 22

Spent absorbent from Example 21 was regenerated with reformed gas for 10 hours at 650° C. This regenerated absorbent had a loading capacity of 1.5 grams $SO_2/100$ grams absorbent at 90% $SO_2$ removal from the simulated flue gas at 150° C.

Example 23

900.0 grams of $Fe_2(SO_4)_3 \cdot nH_2O$ and 234.0 grams of $Al_2(SO_4)_3 \cdot 18H_2O$ were dissolved in 1134.0 grams of water giving a Fe/Al ratio of 10/1. This solution was dried, decomposed at 750° C., formed into 3/16″ pellets and pretreated with $H_2$ for 10 hours at 650° C. This absorbent had a loading capacity of 0.6 grams $SO_2/100$ grams absorbent at 90% $SO_2$ removal from the simulated flue gas at 130° C.

Example 24

Spent absorbent from Example 23 was regenerated with reformed gas for 16 hours at 630–650° C. This regenerated absorbent had a loading capacity of 1.8 grams $SO_2/100$ grams absorbent at 90% $SO_2$ removal from the simulated flue gas at 330° C.

Example 25

100.0 grams of $CuSO_4$, 491.4 grams of $$Al_2(SO_4)_3 \cdot 18H_2O$$

and 171.2 grams of $Fe_2(SO_4)_3 \cdot nH_2O$ were dissolved in 863.0 grams of water giving a Cu/Al/Fe ratio of 1/1/1. This solution was dried, decomposed at 750° C., formed into granules and pretreated with $H_2$ for 10 hours at 650° C. At 90% $SO_2$ removal from the simulated flue gas this absorbent had loading capacities of 3.7 grams $SO_2/100$ grams absorbent at 330° C.; 14.1 grams $SO_2/100$ grams absorbent at 450° C.; and 15.6 grams $SO_2/100$ grams absorbent at 500° C.

Example 26

A spherical silica support material was impregnated with a solution containing $Fe_2(SO_4)_3$ and $Al_2(SO_4)_3$, dried, and pretreated with $H_2$ for 4 hours at 400° C. The impregnation yielded an oxide absorbent having 32.3% Si, 3.9% Al and 7.7% Fe. At 90% $SO_2$ removal from the simulated flue gas this absorbent had loading capacities of 10.3 grams $SO_2/100$ grams absorbent at 400° C. and 12.9 grams $SO_2/100$ grams absorbent at 450° C.

Example 27

Spent absorbent from Example 26 was regenerated with $H_2$ for 4 hours at 400° C. This regenerated absorbent had a loading capacity of 11.3 grams $SO_2/100$ grams absorbent at 90% $SO_2$ removal from the simulated flue gas at 400° C.

Example 28

A spherical alumina support material was impregnated with $Fe_2(SO_4)_3$ and $Al_2(SO_4)_3$ dried, and pretreated with $H_2$ for 4 hours at 400° C. The absorbent contained oxides in the amount of 39.5% Al and 7.7% Fe. At 90% $SO_2$ removal from the simulated flue gas this absorbent had loading capacities of 1.3 grams $SO_2/100$ grams absorbent at 330° C. and 13.5 grams $SO_2/100$ grams absorbent at 400° C.

Example 29

Spent absorbent from Example 28 was regenerated with $H_2$ for 4 hours at 400° C. At 90% $SO_2$ removal from the simulated flue gas this regenerated absorbent had loading capacities of 2.0 grams $SO_2/100$ grams absorbent at 330° C. and 14.6 grams $SO_2/100$ grams absorbent at 400° C.

Example 30

A spherical silica support material was impregnated with a solution of $CuSO_4$ and $Fe_2(SO_4)_3$ dried and pretreated with $H_2$ for 4 hours at 400° C. This absorbent contained oxides in the amount of 31.5% Si, 9.1% Cu and 5.8% Fe. At 90% SO removal from the simulated flue gas this absorbent had loading capacities of 2.5 grams $SO_2/100$ grams absorbent at 330° C. and 6.1 grams $SO_2/100$ grams absorbent at 400° C.

Example 31

Spent absorbent from Example 30 was regenerated with $H_2$ for 4 hours at 400° C. At 90% $SO_2$ removal from the simulated flue gas this regenerated absorbent had loading capacities of 2.4 grams $SO_2/100$ grams absorbent at 330° C. and 6.8 grams $SO_2/100$ grams absorbent at 400° C.

Example 32

A spherical alumina support material was impregnated with a solution containing $CuSO_4$ and $Fe_2(SO_4)_3$, dried and pretreated with $H_2$ for 4 hours at 400° C. This absorbent had an oxide analysis of 37.5% Al, 8.9% Cu and 5.2% Fe. At 90% $SO_2$ removal from the simulated flue gas this absorbent had loading capacities of 7.5 grams $SO_2/100$ grams absorbent at 400° C. and 16.7 grams SO/100 grams absorbent at 450° C.

Example 33

Spent absorbent from Example 32 was regenerated with $H_2$ for 4 hours at 400° C. At 90% $SO_2$ removal from the simulated flue gas this regenerated absorbent had loading capacities of 4.4 grams $SO_2/100$ grams absorbent at 330° C. and 8.3 grams $SO_2/100$ grams absorbent at 400° C.

Example 34

A spherical silica support material was impregnated with a solution containing $Al_2(SO_4)_3$ and $CuSO_4$, dried and pretreated with $H_2$ for 4 hours at 400° C. This absorbent had an oxide analysis at 32.2% Si, 4.8% Al and 7.7% Cu. At 90% $SO_2$ removal from the simulated flue gas this absorbent had loading capacities of 0.7 gram $SO_2$/100 grams absorbent at 130° C.; 5.0 grams $SO_2$/100 grams absorbent at 330° C.; 7.2 grams $SO_2$/100 grams absorbent at 400° C.; and 8.6 grams $SO_2$/100 grams absorbent at 450° C.

Example 35

Spent absorbent from Example 34 was regenerated with $H_2$ for 4 hours at 400° C. At 90% $SO_2$ removal from the simulated flue gas this regenerated absorbent had loading capacities of 2.2 grams $SO_2$/100 grams absorbent at 330° C. and 5.6 grams $SO_2$/100 grams absorbent at 400° C.

Example 36

A spherical alumina support material was impregnated with a solution containing $Al_2(SO_4)_3$ and $CuSO_4$, dried, and pretreated with $H_2$ for 4 hours at 400° C. This absorbent had an oxide analysis of 39.0 Al and 8.6% Cu. At 90% $SO_2$ removal from the simulated flue gas this absorbent had loading capacities of 1.2 grams SO/100 grams absorbent at 130° C.; 5.2 grams SO/100 grams absorbent at 330° C.; 7.5 grams $SO_2$/100 grams absorbent at 500° C.; and 10.4 grams $SO_2$/100 grams absorbent at 450° C.

Example 37

Spent absorbent from Example 36 was regenerated with $H_2$ for 4 hours at 400° C. At 90% $SO_2$ removal from the simulated flue gas this regenerated absorbent had loading capacities of 3.8 grams $SO_2$/100 grams absorbent at 130° C.; 7.1 grams $SO_2$/100 grams absorbent at 330° C.; 8.9 grams $SO_2$/100 grams absorbent at 400° C.; and 11.2 grams $SO_2$/100 grams absorbent at 450° C.

The above examples are illustrative of the variety of absorbents which can be prepared according to this invention.

Though the invention has now been described with reference to particular preferred embodiments and examples, the scope of the invention should not be restricted thereto, but rather is distinctly defined in the claims presented hereinbelow.

What is claimed is:

1. A method of preparing absorbent for use in the removal of acidic oxygenated sulfur compounds from gases containing the same consisting essentially of the steps of:
    (a) forming a metal sulfate solution consisting of aluminum sulfate and the sulfate of at least one metal selected from the group consisting of copper and iron such that the weight ratio between any two of the metals present in said solution is no higher than 10/1;
    (b) recovering from said solution a solid sulfate salt mix of said metals, said recovery step consisting of drying said solution to form a precipitate consisting of an intimate mixture of metal sulfates;
    (c) working said mix into particulate form suitable as said absorbent; and
    (d) thermally decomposing said mixture of solid sulfate to the oxide form.

2. The method of claim 1 wherein the sulfate solution of step (a) includes only two metals in a weight ratio of no higher than 4/1.

3. The method of claim 2 wherein the absorbent is further treated with a reducing gas at a temperature of from about 350–650° C. for a period of time of from about 1–20 hours.

4. A method of preparing absorbents for use in removal of acidic oxygenated sulfur compounds from gases containing the same consisting essentially of:
    (a) forming a metal sulfate solution consisting of aluminum sulfate and the sulfate of at least one metal selected from the group consisting of copper and iron such that the weight ratio between any two of the metals present in said solution is no higher than 10/1;
    (b) recovering from said solution a solid sulfate salt mix of said metals, said recovery step consisting of impregnating with said solution a support material selected from the group consisting of silica, alumina and silica-alumina; and
    (c) thermally decomposing said mixture of solid sulfate to the oxide form.

5. The method of claim 4 wherein the sulfate solution of step (a) includes only two metals in a weight ratio of no higher than 4/1.

6. The method of claim 5 wherein the absorbent is further treated with a reducing gas at a temperature of from about 350–650° C. for a period of time of from about 1–20 hours.

References Cited

UNITED STATES PATENTS

| | | | |
|---|---|---|---|
| 2,747,968 | 5/1956 | Pigache | 23—178 |
| 3,411,865 | 11/1968 | Pijpers et al. | 23—178 X |
| 3,501,897 | 3/1970 | Van Helden et al. | 55—73 |

FOREIGN PATENTS 1,152,738   5/1969   Great Britain.

REUBEN FRIEDMAN, Primary Examiner

R. W. BURKS, Assistant Examiner

U.S. Cl. X.R.

23—2, 178; 55—73; 252—189